US008214887B2

(12) United States Patent
Clark et al.

(10) Patent No.: US 8,214,887 B2
(45) Date of Patent: Jul. 3, 2012

(54) METHOD AND SYSTEM FOR PROVIDING USER ACCESS TO A SECURE APPLICATION

(75) Inventors: John F. Clark, Orem, UT (US); Timothy Dingwall, Wanniassa (AU); Jason Hart, Freemont, CA (US); Matthew Herscovitch, Chapman (AU)

(73) Assignee: Actividentity (Australia) Pty Ltd., Deakin Australian Capital Territory (AU)

( * ) Notice: Subject to any disclaimer, the term of this patent is extended or adjusted under 35 U.S.C. 154(b) by 1228 days.

(21) Appl. No.: 11/384,634

(22) Filed: Mar. 20, 2006

(65) Prior Publication Data

US 2006/0265740 A1 Nov. 23, 2006

(30) Foreign Application Priority Data

Mar. 20, 2005 (AU) .................................. 2005901377

(51) Int. Cl.
*H04L 29/06* (2006.01)
(52) U.S. Cl. ........................................... 726/8; 713/168
(58) Field of Classification Search ..................... 726/8
See application file for complete search history.

(56) References Cited

U.S. PATENT DOCUMENTS

| 5,732,275 | A * | 3/1998 | Kullick et al. ................ 717/170 |
| 6,178,511 | B1 | 1/2001 | Cohen et al. |
| 6,826,696 | B1 * | 11/2004 | Chawla et al. .................... 726/4 |
| 7,150,038 | B1 * | 12/2006 | Samar ............................ 726/8 |
| 7,540,020 | B1 * | 5/2009 | Biswas et al. .................... 726/6 |
| 2002/0057678 | A1 * | 5/2002 | Jiang et al. .................... 370/353 |
| 2002/0099940 | A1 * | 7/2002 | Wang ............................ 713/168 |
| 2002/0138488 | A1 * | 9/2002 | Trivedi ............................ 707/10 |
| 2003/0004886 | A1 * | 1/2003 | Chandar et al. ................. 705/52 |
| 2003/0105981 | A1 | 6/2003 | Miller et al. |
| 2003/0158949 | A1 | 8/2003 | Miller et al. |
| 2003/0188193 | A1 | 10/2003 | Venkataramappa |
| 2004/0003081 | A1 | 1/2004 | Justus et al. |
| 2004/0128393 | A1 * | 7/2004 | Blakley et al. ................ 709/229 |
| 2004/0158746 | A1 * | 8/2004 | Hu et al. ........................ 713/202 |
| 2004/0250118 | A1 | 12/2004 | Andreev et al. |
| 2005/0091539 | A1 * | 4/2005 | Wang et al. .................... 713/201 |
| 2005/0182971 | A1 * | 8/2005 | Ong et al. ...................... 713/202 |

FOREIGN PATENT DOCUMENTS

| AU | 2006201131 A1 | 10/2006 |
| WO | 03100629 | 12/2003 |
| WO | 2004040843 | 5/2004 |

(Continued)

OTHER PUBLICATIONS

Becker, "So You Want Single Sign On", 2002, Syntegra, pp. 1-24.*

(Continued)

*Primary Examiner* — Taghi Arani
*Assistant Examiner* — Thaddeus Plecha
(74) *Attorney, Agent, or Firm* — Muirhead and Saturnelli, LLC

(57) ABSTRACT

A method and system for providing remote user access to secure applications by deployment of SSO software to client workstations, including navigating to a secure server using a web browser on a remote workstation; providing user authorization details to the secure server; downloading an SSO deployment file to the remote workstation upon validation of the user authorization details; executing the SSO deployment file to install an SSO client application on the remote workstation; reading workstation settings and user credentials from a secure file or data store; and running the SSO client application on the workstation to employ the user credentials to logon to the secure application.

20 Claims, 5 Drawing Sheets

FOREIGN PATENT DOCUMENTS

WO 2005069823 8/2005

OTHER PUBLICATIONS

Australian International Search Report dated Feb. 13, 2006.

European Search Report for Appln. No. 06291469.2-1244 dated Feb. 6, 2007.
European Search Report for Appln. No. 06290441.2-1244 dated Feb. 6, 2007.

* cited by examiner

METHOD AND SYSTEM FOR PROVIDING USER ACCESS TO A SECURE APPLICATION

CROSS-REFERENCE TO RELATED APPLICATIONS

This application is related to Australian Provisional Application No 2005901377 filed in relation to the above titled invention by the present applicant under its (now) former name, Protocom Development Systems Pty Ltd, on 20 Mar. 2005.

BACKGROUND OF THE INVENTION

1. Field of the Invention

The present invention relates to provision of user access to a secure application, particularly although not exclusively, providing a remote user with secure access to authentication credentials required for reduced or single sign-on services to applications. The invention also relates to the convenient storage and management of such user credentials.

2. Discussion of the Background Art

Reduced or single sign-on (SSO) services have been developed to manage authentication of users wishing to access secure applications, in order to overcome difficulties with management of authentication credentials (such as user names and passwords) of users. One example of an SSO service is discussed in US Patent Publication No. 2004/0163087 assigned to the present applicant and in co-pending Australian Patent Application No. 2004200465, also filed by the present applicant in its former name.

In one form of SSO system there is included a client application installed on a user workstation, which application runs as a background process on the workstation. Such a client application is conventionally installed, whether from local portable storage media or over a secure network connection to a local network server, by adding a persistent program to the menu of applications programs accessible by the workstation's operating system.

However, some organisations are disinclined to distribute single sign-on client applications for installation on a remote user work station in an uncontrolled environment. A home office computing environment, for example, may not be as well protected from external security threats as an office workstation coupled to a fire-walled corporate network. A highly mobile user may further wish to have a reduced or single sign-on capability from a communal computer work station, such as provided in a hotel business centre or Internet cafe. Installation of persistent client applications on a communal or shared work station is generally not possible or at least highly undesirable.

The disclosure in US 2003/0158949 (Miller et al) is concerned with a single sign on system without a central session management server, wherein a session credential can be validated on multiple application servers without requiring communication with a central session management server in order to validate the session credential. Miller requires that the client provide service-independent session credential to the target application servers, requiring the client machine to directly communicate with the application program server (instead of an application client). Accordingly, this arrangement is limited to a scenario where the same session credential can be validated by all target application servers.

In other arrangements, a web browser application installed on a user's workstation can be used to access a corporate web site when the workstation is coupled to the Internet. Where the web site incorporates a corporate web portal provided by a back-end portal server, the portal can display information to a corporate user in a consolidated form. The portal server can achieve this by authenticating the user to the secure application on behalf of the user. Thus the single sign-on process occurs between the back-end server and the secure application. However, this arrangement does not address the issue of providing initial secure access to the portal server via the user's web browser application.

The disclosure in US 2003/0105981 (Miller et al.) is concerned with a single sign on system, wherein credentials from a first computer system are placed on a client and used by a second computer system to effectively impersonate the client to the first system for validation purposes. When the first system confirms the validity of the credentials the second system uses that validation to grant access to the client machine. In one embodiment discussed in Miller, the first system is a central logon server and the second system is a target application server that relies on a token generated by the first system. Miller requires that the client machine to provide a service-independent credentiavtoken to the target application system. However, the credentiavtoken is not related to the application credentials rather it is associated with another trusted system, requiring the second system to communicate with the first system to validate the credential/token.

In a manner similar to web portal single sign-on service terminal server configurations, such as Microsoft Terminal Server™ and Citrix Metaframe™ or equivalents, many existing SSO solutions run on the terminal server rather on a remote workstation. Because of this configuration, these solutions are limited to providing SSO services to applications running in the terminal server environment and do nothing to provide SSO to applications run on the user's workstation.

The disclosure in US 2004/0003081 (Microsoft) is concerned with a single sign on system, wherein a single sign on server receives a request from the client's credentials from a computer program, determines whether the client's credentials are stored in a database, and sends the client's credentials from the database to the computer program. The Microsoft arrangement requires the single sign on server to present the client credentials authorizing access to the application to the target computer program directly, wherein the SSO engine is on the server rather than the client machine.

The disclosure in US 2004/0250118 (IBM) is concerned with an access portal server that provides a front-end to a set of target applications, providing a single point of authentication for all of the target applications. The access portal server incorporates an SSO engine that provides application credentials to a target application after the target application is selected, and then transfers the authenticated target application session from the access server to the client machine. The IBM arrangement requires that the access server to present the application credentials to the target application directly where, again, the SSO engine is on the server instead of on the client machine.

A further problem with SSO solutions exists when credentials for accessing secure applications hosted by backend systems must be reset or changed. Ordinarily the reset or change of credentials involves going into the normal interface for the backend system; resetting/changing the password or other credentials; accessing the SSO interface and setting the new credential in SSO. However, this procedure is both time consuming and error prone.

The disclosure in US 2003/0188193 (IBM) is concerned with a single sign on system, wherein credentials from a first system are placed on a client and used by a second system to impersonate the client to the first system. When the first system confirms the validity of the credentials the second system uses that validation to grant access to the client. In one described embodiment utilizing Kerberos authentication, the first system is a central logon server and the second system is a target application server that relies on a token generated by the first system. This arrangement requires the client to provide a service-independent credential/token to the target application system, limiting the invention to when the credential/token is not related to the application credentials themselves but is associated with another trusted system, and further limiting the invention to when the second system communicates to the first system to validate the credential/token.

The reference to any prior art in this specification is not, and should not be taken as an acknowledgement or any form of suggestion that the referenced prior art forms part of the common general knowledge in Australia.

SUMMARY OF THE INVENTION

Object of the Invention

The present invention aims to provide an alternative to existing arrangements for providing remote access to secure applications, particularly for the deployment of client-based enterprise SSO software providing user authentication.

Certain embodiments of the invention address at least some of the drawbacks of the reduced or single sign-on services of the background art.

Disclosure of the Invention

In one broad form, the present invention resides in a method for providing remote user access to secure applications by deployment of SSO software to client workstations, said method including the steps of:

navigating to a secure server using a web browser on a remote workstation;

providing user authorisation details to the secure server;

downloading an SSO deployment file to the remote workstation upon validation of the user authorisation details;

executing the SSO deployment file to install an SSO client application on the remote workstation;

reading workstation settings and user credentials from a secure file or data store; and running the SSO client application on the workstation to employ the user credentials to logon to the secure application.

Most preferably in the case of a shared workstation, the method includes a further step of uninstalling the SSO client application when the web browser application is terminated, the user logs off from a current session or the client workstation is re-started. Alternatively in the case of a single user workstation, the SSO client application starts automatically without the need for re-entry of user credentials.

Suitably, the SSO client facilitates reduced or single sign on type remote access to a plurality of secure applications.

The secure file for user credentials may be stored on the user workstation, on the web server and/or on a secure third party server. The secure file may take the form of an LDAP directory entry, an ordinary file on a local or remote file system, a file on a portable storage device (such as a USB drive), a token or a smart card. The user credentials may take the form of identifiers; passwords, including one-time passwords (OTP); pass phrases; certificates; encryption, signing and authentication key pairs or keys; Kerberos tickets; any other authentication or authorisation data. In one particularly preferred form, the user credentials are secured in a local file by the user authorisation details, such as an initial username and password.

The step of installing the SSO client application may be undertaken dynamically to deliver client application functionality based on client location and/or user credentials.

Preferably the present method includes the precursor step of consolidating, encrypting and storing user credentials in the secure file or data store. Suitably user authorisation details are encrypted and stored on the web server.

The SSO application is suitably adapted to intercept and respond to authentication requests issued by the secure application, preferably including requests issued by mainframe applications, web sites, Java applications, Unix applications and/or Windows applications.

In the event that a secure application prompts user credentials to be changed, the SSO application is preferably further adapted to:

intercept such application prompts;

ask the user for the changed credentials or automatically generate changed user credentials;

validate that the changed credentials meet the secure application's requirements;

enter the changed credentials into the application prompt that was intercepted; and encrypt and send the changed credentials to the secure file or datastore.

If required, changes to the SSO datastore may be monitored and transferred to an authentication database of the secure application.

In a further broad aspect the invention resides in a method for providing graded user access to a secure application available on a computer system, said method including the steps of:

authenticating a user for access to a secure application, which application has a graded access policy;

gathering information about the performance and/or location of authentication of the user;

generating a one-time password (OTP) facilitating access to the secure application by the user; and inserting into the OTP information specifying the user authentication information gathered above, to enable allocation of an appropriate grade of access for the user according to the access policy.

Preferably the information gathered about authentication includes the exact methods by which the authentication was performed and the location from which the authentication was performed.

Suitably the allocation of the grade of user access involves restricting what operations the user is authorised to take within the secure application based on the exact methods by which the authentication was performed and at the location from which the authentication was performed.

In a further broad form, the invention resides in a method for providing remote user access to secure applications, said method including the steps of:

temporarily installing a secure portable storage device having an SSO deployment file in a remote workstation;

prompting a user of the remote workstation for authorisation details;

providing the user authorisation details to the secure portable storage device;

providing the remote workstation with access to the SSO deployment file upon validation of the user authorisation details;

executing the SSO deployment file to install an SSO client application on the remote workstation;

reading workstation settings and user credentials from a secure file or data store;

running the SSO client application on the workstation to employ the user credentials to logon to the secure application; and uninstalling the SSO client application when the web browser application is terminated, the user logs off from a current session or the client workstation is re-started.

The SSO client application may, in the alternative, start automatically without the need for re-entry of user credentials, provided user authorisation details are valid.

In another broad form, the invention resides in A system for providing remote user access to secure applications, said system including:

a secure server coupled to a publicly accessible global communications network, said secure server having a single sign-on (SSO) service module, an SSO deployment file and associated user authorisation details;

at least one remote workstation having a web browser for navigating to the secure server via the publicly accessible global communications network; and wherein the SSO deployment file includes instructions for execution on a plurality of processors for performing the above described method.

The SSO service module preferably effects initial user authentication and thereafter manages download of the SSO deployment file for execution on said at least one remote workstation.

The SSO deployment file suitably includes a management control program for controlling download from the secure server and installation of an SSO client application on said at least one workstation.

The SSO client application, once installed, can provide sign-on and user credential caching in relation to said secure application for the user at said remote workstation.

In still another broad form, the invention further includes a sub-system for reverse synchronisation of user credentials required to access secure applications for a server managing an SSO datastore accessable by a plurality of remote workstations, said sub-system including:

an SSO datastore monitor server coupled to the server for monitoring changes to user credentials in the SSO datastore; and upon changes being effected to user credentials for a secure application, said SSO datastore monitor server is adapted to:
  connect to a respective back-end system hosting said secure application, and
  modify the corresponding user credentials held in an authentication database for the secure application on the back-end system.

BRIEF DETAILS OF THE DRAWINGS

In order that this invention may be more readily understood and put into practical effect, reference will now be made to the accompanying drawings illustrate preferred embodiments of the invention, and wherein.

DESCRIPTION OF EMBODIMENTS OF THE INVENTION

Figure 1:
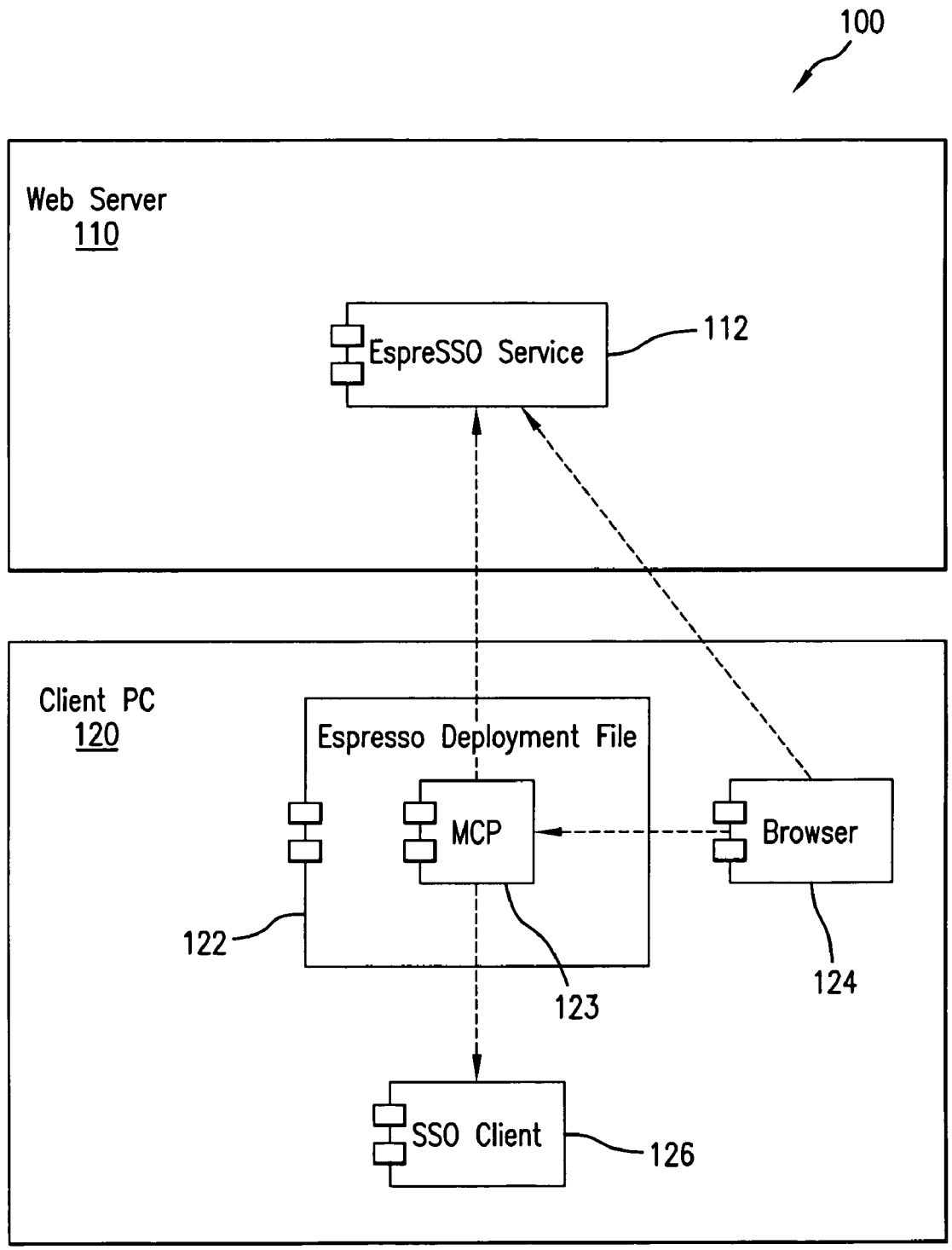
FIG. 1 is a block diagram showing the main software modules utilised by a first embodiment of the invention.

In FIG. 1 there is shown a web server 110 which is coupled to an exemplary client PC or workstation 120 via a publicly accessible global communications network, such as the Internet. The web server 110 and the client workstation 120 constitute the operational environment 100 of a first embodiment of the method of the invention. The method of the first embodiment utilises a number of software modules, including an "EspreSSO" single sign-on (SSO) service module 112 resident on the web server 110, together with an "EspreSSO" deployment file (EDF) module 122, a conventional web browser 124 and an SSO client module 126, each deployed to or, in the case of the browser such as Microsoft Internet Explorer™, resident on the workstation 120. The deployment file module 122 further includes a management control program (MCP) sub-module 123.

The function of each of the modules will now be described briefly. The SSO service module 112 is responsible for initial user authentication, client download and configuration information management. In the present embodiment, the service is constituted by a Java Servlet responding to HTTP requests sent over SSL. However, a wide range of alternative technologies may be utilised for implementation of the service module functions, as desired.

The deployment file module 122 is responsible for executing native code within the web browser and ensuring the integrity of that native code, suitably using digital signatures. In the present embodiment, the deployment file is implemented using CAB/ICD for Internet Explorer, although other embodiments may employ XPI for Mozilla's "Firefox" browser. Furthermore other mechanisms for ensuring integrity of the executable native code may be employed in the alternative.

The MCP sub-module provided with the deployment file is responsible for controlling download of the SSO client 126. The MCP sub-module provides a local web server function which executes within the user's security context and employs a bootstrap configuration. This insulates the client SSO application from the configuration mechanism and allows a portable storage device, such as a Universal Serial Bus (USB) drive solution. The MCP sub-module may be implemented in the embodiment using a Microsoft Windows executable file.

The browser module 124 is responsible for downloading and executing the deployment file 122, providing a user interface for the local web server and for the SSO service. The browser may be Internet Explorer or Mozilla Firefox or another compatible web browser.

The SSO client 126 is responsible for providing the sign-on and handling lifetime management and user credential caching. A configuration interface is provided specifically for this purpose, as will be described further below.

The operation of each of the modules of the embodiment will now be described in further detail below:

SSO Service

The primary responsibility of the SSO service module is to facilitate the download of the deployment file 122 to the client workstation 120 from the web server 110. To do this the service module 112 generates an HTML user interface readable by the web browser 124 and from which the user can start the download. The second responsibility of the SSO service is to authenticate the user of the client workstation 120. This involves presenting a log-on form in the HTML user interface, which when completed and submitted by the user starts the download of the SSO deployment file 122.

The last and more complex area of responsibility for the SSO service module 112 is the storage and retrieval of SSO configuration data. The simplest part of this is a bootstrap configuration document that instructs the SSO client 126 as to which data store mode it should run in, and the servers with which it should connect. The more complex part of this procedure is to allow the secure retrieval by the client of the authentication details entered into the log-on form.

It is recognised that there are a large number of competing technologies available for creating web applications such as the SSO service module, including Java Servlets, .Net server and CGI/mod_perl solutions. However, the present embodiment described herein utilises Java Servlet technology in view of the applicant's successful implementation of earlier related products, including the SSO service discussed above in the background art. Furthermore the applicant has access to suitable data store interface libraries written in Java and is aware that Java Servlet containers are available on a wide range of Microsoft and non-Microsoft computing platforms.

SSO Deployment File

The SSO deployment file module 122 is a group of Windows binary files packaged such that they can be securely downloaded from a web site and then executed by the web browser as a normal Windows application. From the perspective of client workstation security, this is clearly a very dangerous operation, hence web browsers typically employ digital certificates and other security mechanisms to ensure that only trusted binaries are installed and executed. The EspreSSO deployment file (EDF) module will contain only the binary files required for starting the MCP. The EDF can be viewed as a means of downloading and running the MCP in a secure fashion without user intervention.

The present embodiment of the invention happens to target Microsoft Internet Explorer (IE) browsers. IE includes several technologies that can be used to create an EDF, including the Microsoft's Internet Component Download (ICD) technology. Another option is use of a signed Java package which may become more viable as the support for Java within IE improves.

ICD is a technology design to allow the secure download and execution of ActiveX controls in a web browser by wrapping all of its components in CAB files, which files can then be signed. If a CAB file is signed with a certified software publisher certificate, the user is still prompted to accept the download, but the screen says that the CAB file can be trusted.

However ICD is not without some drawbacks, including the way in which some systems administrators are restricting IE functionality. ActiveX controls have worried administrators since their introduction on security grounds, as they allow execution of code on a client machine. To address these concerns, technologies such as Java and .Net have arisen which provide similar functionality to ActiveX, but which restrict the activities of these components to a safe "sand box". In response, many administrators have turned off the ActiveX functionality in their browsers, a move which then prevents ICD execution.

While posing a problem for the ICD EDF format of the embodiment, the .Net platform still provides mechanisms which can be used to achieve similar functionality. The .Net Smart Client Model allows for the secure download of Net executables in an alternative embodiment of the invention.

The applicants are cognisant that Internet Explorer is not the only web browser in widespread use. Mozilla's "Firefox" browser is growing in popularity, and hence a different EDF format will be developed for it. Fortunately, Firefox includes an extension download mechanism that support signing and automatic download in a similar fashion to ICD. The system, called XPInstall (XPI), is used throughout the browser itself, and is relatively simple to use.

Management Control Program

The MCP 126 is responsible for controlling the SSO client download and operation. When started from the EDF module 122, the MCP's first responsibility is to download other required components, such as additional executable files and dynamic link libraries (DLLs). This is done from the MCP and not the EDF for two reasons. First, the less that is packaged in the EDF the easier it will be to create EDFs for different browsers (eg. for Firefox as foreshadowed above), and secondly it allows the download of exactly those components that are required without a large number of files within the EDF.

Once all of the required components are downloaded, the MCP's task is to correctly configure the SSO client 126 and start it. To do this the MCP downloads configuration information from the SSO Service 112, and uses this to setup the SSO client 126 so that it will start automatically without user intervention. If the user entered lightweight directory access protocol (LDAP) credentials in the SSO service logon form, the MCP also retrieves these from the SSO Service and supplies them to the SSO client.

SSO Client

The SSO Client 126 is responsible for signing on to configured secure applications, and running wizards to allow applications to be configured. It is intended that, once installed on the client work station 120, the SSO client of the embodiment should function in an equivalent fashion as a standard SSO client. This is desirable for compatibility reasons and to allow updates made to the standard client can be made available to Espresso users immediately.

In an alternative embodiment, the MCP may be integrated within the SSO client, wherein the SSO Deployment File is arranged to configure and control the download.

Web Browser

The web browser 124 is responsible for rendering the HTML web pages from the "Espresso" SSO Service 112 and downloading and executing the EDF module 122. The rendering of HTML is reasonably well standardized and should not vary significantly amongst different browsers. The download and execution of the EDF on the other hand is browser and operating system specific. Accordingly, the EDF files will require tailoring to specific end-use, as discussed in the EDF section above.

Figure 2:
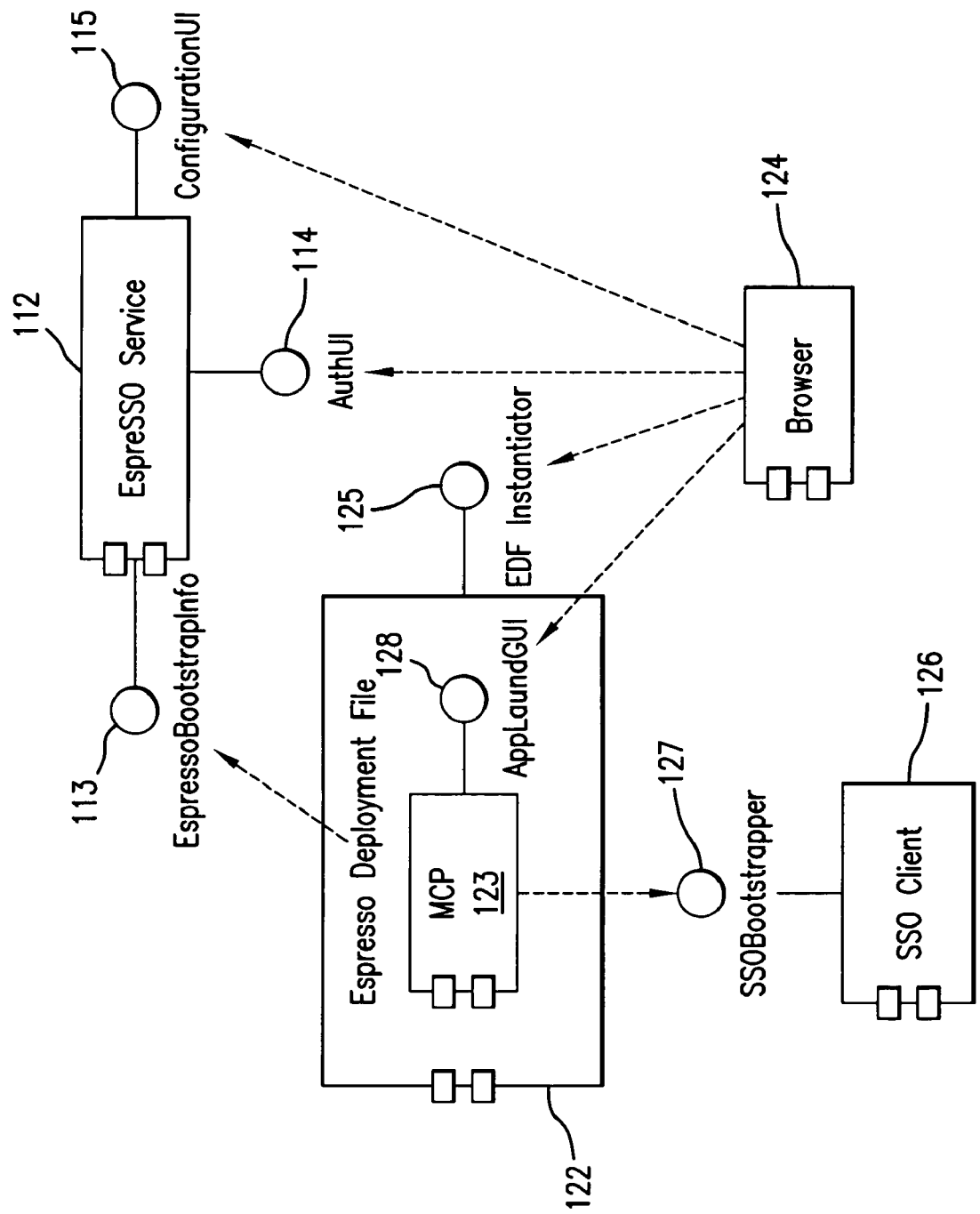
FIG. 2 is a diagram illustrating the arrangement of interfaces amongst the software modules which allow communications between a web server and a client workstation of the first embodiment.

Turning to FIG. 2, the functional modules of the embodiment are illustrated with their respective interfaces. In the embodiment all interfaces are implemented using HTTP POST and GET messages. Considering the SSO service module 112, the EspreSSOBootstrapinfo interface 113 provides a document listing, datastore mode and other configuration options for the MCP sub-module 123 which will be discussed further below. This interface also allows for one-time retrieval of authorisation credentials from the SSO service 112. The AuthUI interface 114 provides the initial HTML graphical user interface (GUI) page for the Browser 124. The ConfigurationUI interface 115 provides HTML configuration for the GUI, by provision of get, modify and save functions.

In the case of the EspreSSO deployment file (EDF) module 122, the choice of interfaces depends on the technology chosen for implementation (as discussed briefly above). The EDF Instantiator interface 125 provides, for a CAB implementation, actions are executed by in an .INI style file; whilst for XPI a JavaScript is executed.

Only one interface is supported by the MCP module 123, namely the AppLaunchGUI 128 which is implemented as an embedded HTTP server (hostlocal only). The interface provides a list of installed applications available for launch and replaces an ActiveX component.

All communication with the SSO client module 126 is routed through the SSOBootStrapper interface 127, which allows centralised changes to client mechanisms. The interface provides methods to set data store mode using a configuartion document, set authorisation credentials and both start and stop the client process. Importantly in the embodiment, it is implemented within the client module so that should the SSO client change how it stores its configuration, the implementation of this interface and be conveniently updated at the same time.

Details of further function aspects of certain logical interfaces of the embodiment are set out below:
EspressoBootstrapInfo GetSSOBootstrapConfig—Retrieves a document containing boostrap information for the MCP and SSO client.

GetSSOAuthDetails—Retrieves an XML document containing the usemame, password and any other authentication details entered by the user into the Espresso Service logon page. This method can only be called once, after the first invocation the XML document is destroyed and subsequent calls will fail.

GetEDF—Retrieves the EDF.

GetClientComponent—Retrieves an additional SSO client component.
SSOBootstraper

SetSSOBootstrapConfig—Accepts a document containing bootstrap information for the SSO client.

SetSSOAuthDetails—Accepts a document containing authentication information for the datastore.

StartSSOClient—Starts the SSO client.
AuthUI

HTTPGet—Returns an HTML document displaying the logon form.

HTTPPostSubmitAuthDetails—This method validates the authentication details supplied in the logon form. If these details are correct it returns an HTML document that cases the EDF to be downloaded, otherwise it displays an error page.
AppLaunchUI HTTPGet—Returns an HTML document displaying all of the SSO configured applications that are currently available on the local machine along with hyperlinks to launch them.

Once the code has been deployed to the client workstation, the client code needs to query the Espresso server for configuration and authentication information. Further, other modules need to communicate with each other. Communication between modules on the client PC 120 in the embodiment is performed using function calls exported from Windows DLLs.

Communication between client modules and the Espresso service 112 on the web server 110 is performed using HTTP Post messages. For interfaces such as SSOBootstrapInfo which are designed for automated use, a query string format is described in detail above in the Interfaces section. As HTTP is a stateless protocol, special measures must be taken to ensure that the Espresso Service understands that the current request is linked to a previous request. This is especially important when the first request was an authentication operation which the second request relies upon.

The Java Servlets of the embodiment provide a mechanism known as Sessions to address this issue. When a session is created, an HTTP Cookie called JSESSIONID is returned to the user. In each subsequent request this cookie is sent to the server, allowing the server to know that the requests are all a part of the same session. One difficulty can arise when separate client executable modules want to access the same serviet session. This is a result of the fact that JSESSIONID is a cookie that is tied to the browser session, and may not be accessible to other programs. In this case an external mechanism is provided for this cookie to be propagated to other processes that require access to the same session.

More complex communications interfaces such as SOAP were also considered for this role. While such systems provide some extensibility and advanced features, the simplicity of the data and function call requirements does not warrant such complexity in the present embodiment.

In one mode of use, the method of the first embodiment relates to a roaming corporate user or consumer who is accessing the WebEspresso SSO system (such as web server 110) from a shared workstation (such as client PC 120); installation of the client is ephemeral and employs the following steps:

1. User employs the web browser 124 to navigate to a Web Espresso form furnished by the EspreSSO service 112;
2. User enters username and password comprising the authorisation details into the form;
3. Web Server 110 validates the supplied user authorisation details against a database and starts download of a WebEspresso package in the form of the SSO deployment file 122;
4. Client PC 120 runs the SSO deployment file and further components, including the management control program (MCP) 123, are installed/configured according to the client PC environment;
5. Client settings and user secrets or credentials are read from a secure local file (not shown) or the web server 110;
6. SSO client application effects single sign on to desired/authorised secure applications, including Web applications, Windows applications, Terminal services and Java applications; and
7. When the web browser 124 is terminated, the user session ends or the client PC 120 is restarted the SSO client 126 uninstalls itself.

Steps 1 through 6 of the method described above are shown in FIG. 3, wherein further details of the communications occurring amongst the modules of FIG. 1 utilising the interfaces of FIG. 2 are depicted.

When form displayed by AuthUI is submitted in step 2, the user's credentials are transmitted over the network to the Espresso web server. Two things need to be ensured here, firstly that the server the credentials are being sent to is a trusted Espresso Server, and secondly that no one except that trusted Espresso server can access the credentials. By requiring that all communications with the Espresso server are performed using HTTPS, and assuming that a trust relationship has already been setup between the server SSL certificate and the client browser, both of these concerns can be addressed.

The EDF Instantiator interface 125 is utilised by the browser to create the MCP 123, which is itself launched by the browser via the AppLauchGUI interface 125 in steps 4 and 4.1. Step 5 above is labelled as 4.1.5 and involves obtaining the authorisation details from the EspreSSO service 112 in FIG. 3. After the Espresso service has validated the user credentials provided though the AuthUI form, these credentials must be made available to the MCP. To secure this, the Espresso service must ensure that only the client who submitted the authentication form can then retrieve those credentials. Two mechanisms are employed to ensure this. Firstly, the Espresso SSO service will only return the credentials if the correct JSESSIONID is provided. As JSESSIONID was only transferred between the server and client over SSL, it will only be known to the intended client. Secondly, once the credentials have been retrieved from the Espresso Service they are deleted, meaning that if someone does later discover the correct JSESSIONID they will not be able to access the credentials.

Figure 3:
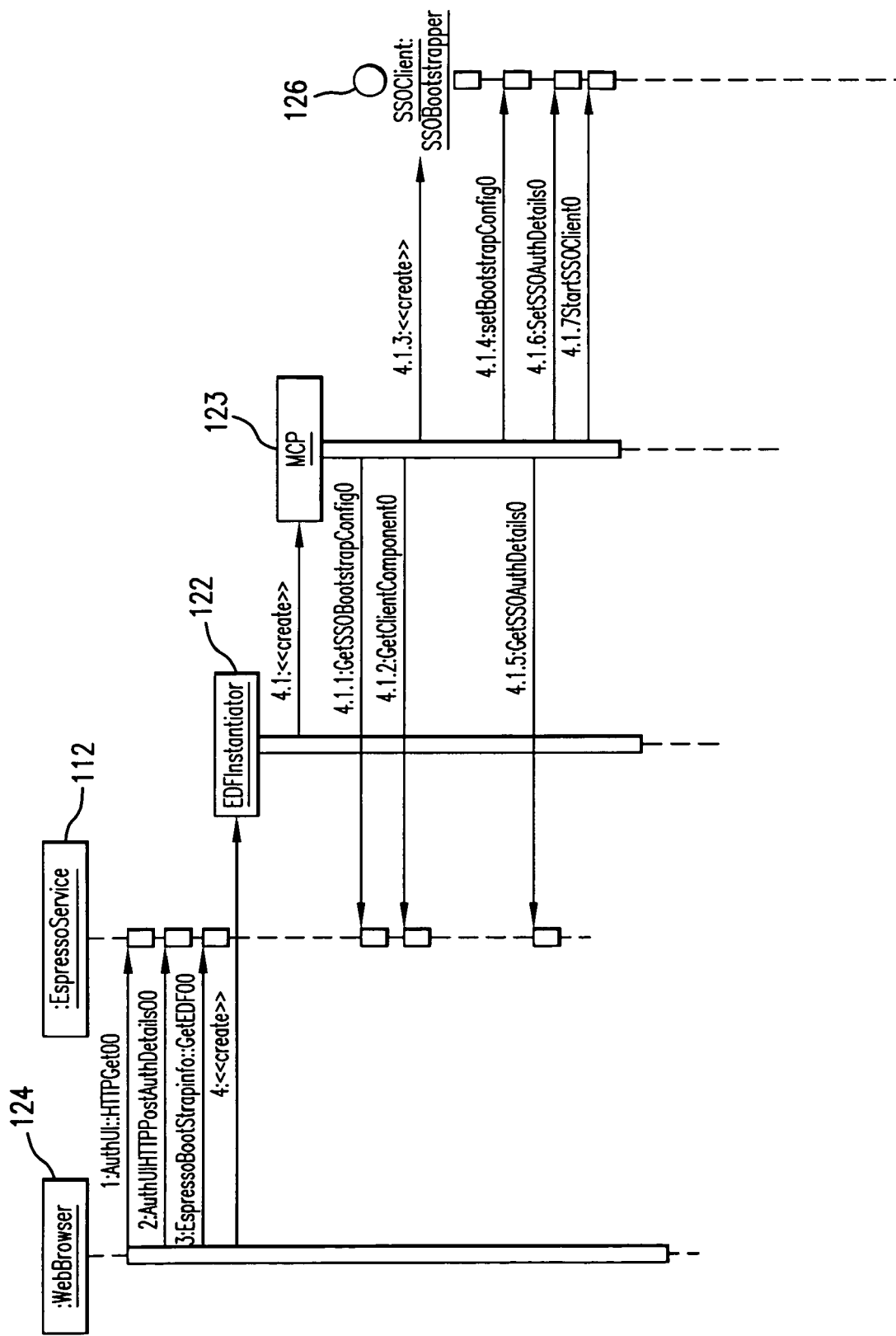
FIG. 3 is a flow diagram depicting the sequence of communications between respective modules of the first embodiment.

Step 6 above is labelled as 4.1.7 in FIG. 3, which step involves the SSO Client module 126 starting after being boot strapped by the MCP utilising the SSOBootstrapper interface 127.

Other embodiments of the method vary according to the intended environment of use. For example, in the case of corporate desktop environments which mostly have a strong package management infrastructure, there are exceptions. Those corporate customers that may only have very limited package deployment systems could conveniently take advantage of the easy deployment offered by WebEspresso. The steps in such a variation to the first embodiment could then include:

1. User navigates to the Web Espresso form;
2. User enters username and password into form;
3. Server validates the supplied user authorisation details against an LDAP Directory and starts download of WebEspresso package;
4. Client PC or laptop runs WebEspresso package and further components are installed/configured as required;
5. Corporate settings and user secrets or credentials are downloaded from an LDAP Directory;
6. SSO client application effects single sign on to selected secure applications, including Web applications, Windows applications, Terminal services and Java applications; and
7. The next time the user logs into their PC or laptop the WebEspresso client application starts automatically without requiring credentials.

In this variation the SSO client application behaves like a traditionally installed application. This variation to the embodiment allows corporate customers to use and manage SSO in the normal way, but to take advantage of the easy deployment offered by the WebEspresso system.

Thus it will be appreciated that the method of the present invention can cater for different environments of use. On the one hand, organisations may wish to provide a single directory based data store for all application and system credentials required by authorised users, regardless of type and level of access authority. Corporate users of Espresso will most likely want to store their configuration information in an LDAP or similar directory. To support this, the standard SSO datastores are available can include ActiveDirectory, eDirectory and LDAP.

Alternatively, for users in a consumer or B2C environment, it is unlikely that a LDAP Directory will be available. Further, many users will not want to store their credentials in a datastore owned by a third party. Accordingly, the following datastore options may be provided to support these scenarios: Standalone; Smart Card and HTTP Datastore. The Standalone Espresso datastore option stores data in a local file which is protected by the username and password from the initial web logon form. The Smart Card option stores data on in a storage area on a smart card protected by a PIN, or stores data in a local file protected by a key stored on the smart card. Whilst the HTTP Datastore option uses HTTP to provide datastore services across the web. Furthermore mobile users may also wish to take a secure wallet of credentials with them during travel, which wallet is secured on the desktop of their PC, laptop, personal digital assistant (PDA), mobile telephone or like portable computing device and on the server.

The method of the invention is a valuable functional extension to a secure single sign-on arrangement, which extensions enable web distribution and dynamic configuration of an SSO client application. The invention broadens the reach of existing SSO arrangements beyond the corporate desktop to users operating in non-standard environments, such as roaming corporate users and home users. In other embodiments, the method opens up the possibility of use by sophisticated organizations, such as banks or Internet service providers (ISPs), who may want to provide SSO to their customers as an additional service.

We now turn to further operational aspects the SSO client application of the embodiment after installation. The SSO application is suitably adapted to intercept and respond to authentication requests issued by the secure application, preferably including requests issued by mainframe applications, web sites, Java applications, Unix applications and/or Windows applications.

In the event that a secure application prompts user credentials to be changed, the SSO application of the embodiment is further adapted to intercept such prompts, ask the user for the changed credentials, validate that the changed credentials meet the secure application's requirements and encrypt and send the changed credentials to the credential datastore. Alternatively the SSO application may automatically generate new or changed credentials for the user. This procedure conveniently keeps the SSO data in synchronism with the requirements of the secure application. The procedure requires a password for a secure application to be changed in the SSO data store, and have a server process change the password in the secure application's authentication database. Accordingly requests to change or reset passwords for secure applications can be executed simply by changing data in the SSO data store.

Figure 6:
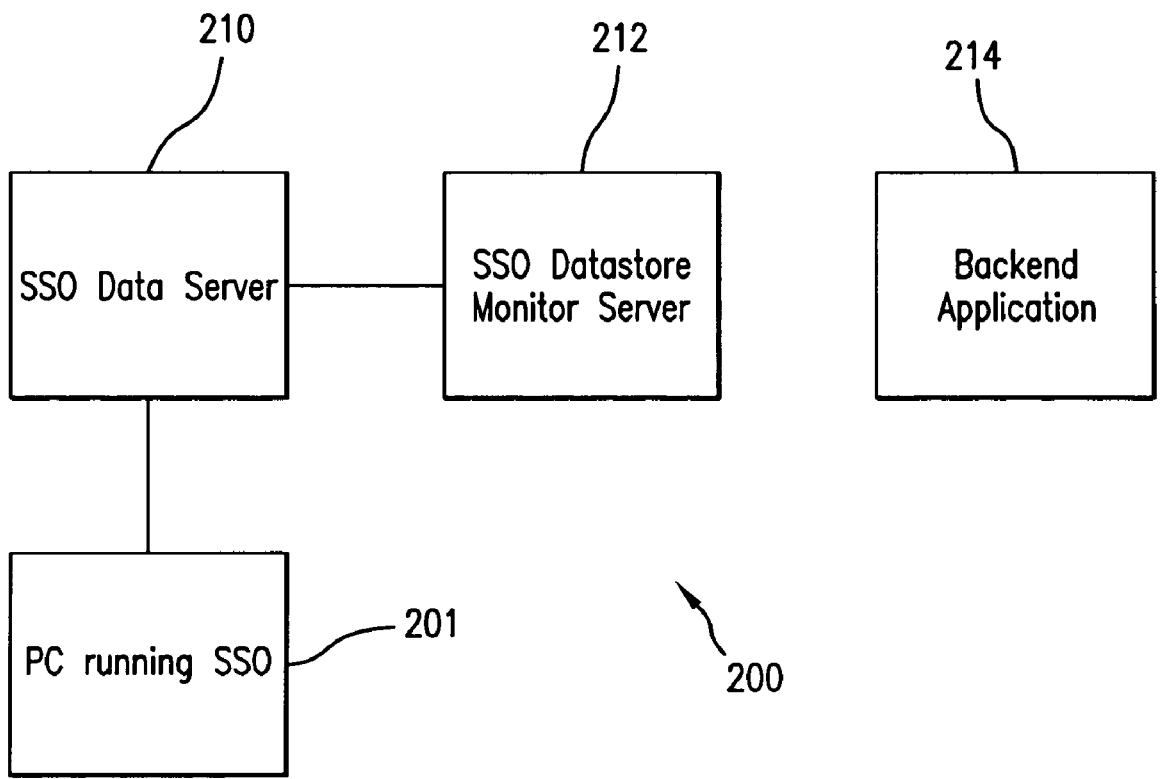
FIG. 6 is a block diagram showing a system of a third embodiment of the invention.

A further enhancement of the SSO system resides in a reverse synchronisation procedure, whereby the SSO datastore is monitored for changes and these changes in credentials are relayed to the authentication database of the relevant secure application. An exemplary system configuration for reverse synchronisation, which is useful for resetting or changing credentials required for accessing secure applications on back-end systems, is illustrated in FIG. 6.

The system 200 of the embodiment includes a user workstation, such as a PC 201, running an SSO service, an SSO data server 210 which holds SSO data in a datastore (not shown), an SSO datastore monitor server 212 which monitors the SSO data store, and a backend application 214 on a back-end machine. The back-end machine also includes an authentication database (not shown) for the secure applications which it hosts. In use, the SSO datastore monitor server 212 watches the SSO data server 210 for any changes to credentials. If any credentials in the SSO data store managed by the SSO data server do change, the monitor server connects to the relevant backend application and modifies its authentication database to reflect the change made the to SSO data store.

It should be appreciated that the PC 201 running SSO and the SSO data server 210 may be configured using either the SSO download solution of the present invention or, alternatively, a prior art SSO solution such as a persistent installation from distribution media.

Where a highly mobile user is utilising a credential wallet in a handheld device, such as a PDA or smart mobile telephone, the SSO datastore can also synchronise with the wallet. This is particularly advantageous in cases where the SSO system is randomly generating credentials, or when as one-time passwords (OTPs) are being used.

The applicant recognises that OTPs are an authentication mechanism with a number of useful security properties, whereby OTP authentication mechanisms are resistant to phishing attacks and also find utility on insecure networks. However, it has been realised that the insertion of information specifying how an authentication was performed into the OTP can enable graded access. This would only require changes only to the initial authentication infrastructure and the secure applications, and not require changes to any intermediate systems.

The applicant's WebEspresso SSO application download method extends the reach of secure log-in SSO to any computer with a web browser. Accordingly, a user need not remember passwords where they can access such a computer. However, there are still some instances in which a password may be required and a computer with a web browser/web access is not available. For example, a user may be booking air travel over the telephone and require a personal identification number (PIN) to authenticate their identity. If that user has been using SSO for some time they may well have forgotten that PIN and, if a regularly used SSO client application is enabled to generate random user credentials, then that user will not know the relevant credential. It is to cover this situation and others like it that a further system has been developed.

Portable computing devices, such as Personal Digital Assistants (PDAs) which are now sometimes integrated with mobile telephones, are becoming ubiquitous. These devices can run small applications and communicate with other computers, using either a cable or wireless connections (such as infrared or Bluetooth links) whether via public communication channels (such as the Internet) or via private or proprietary communications channels. A system 300 of a second embodiment of the invention utilises the programmability of these devices and their ability to communicate with a computer to create a secure store of user credentials.

Figure 4:
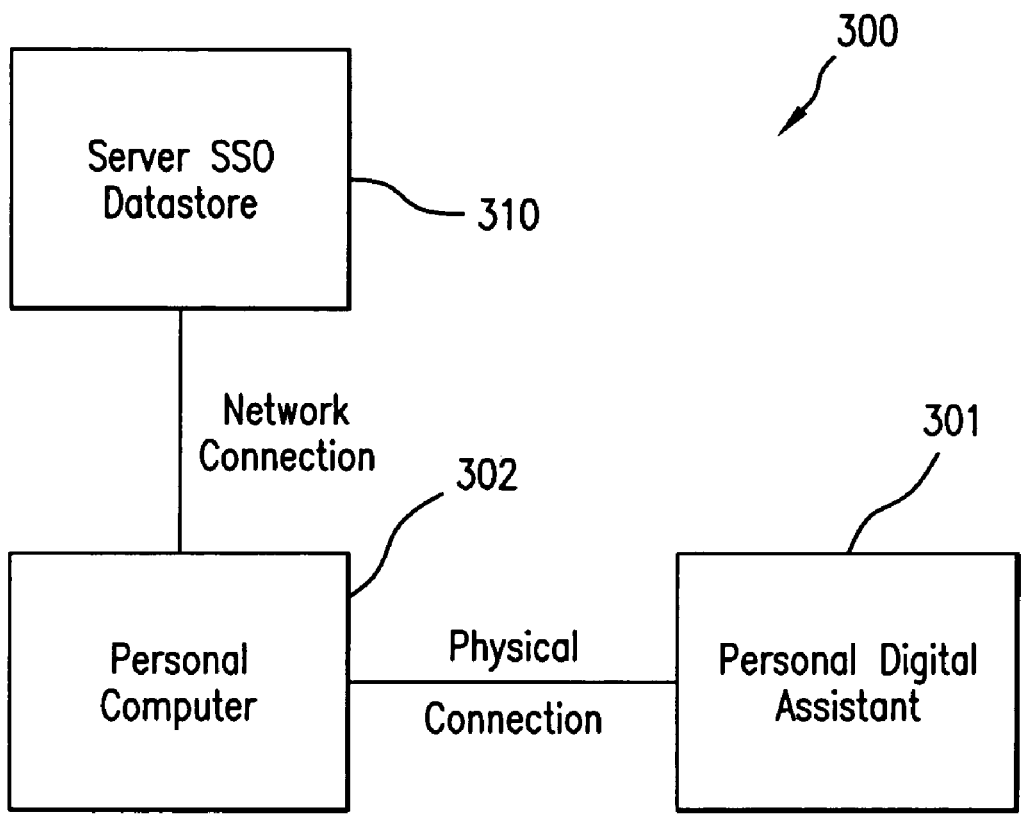
FIG. 4 is a block diagram showing components of a second embodiment of the invention in one configuration.

In a first configuration of the embodiment illustrated in FIG. 4, a PDA 301 is connected to a personal computer (PC) 302 that is running an SSO service. The SSO service includes an extension that is responsive to requests for user credentials from the PDA. A program is installed on the PDA that makes such requests to the SSO service on the PC to retrieve all of the user's credentials (usernames, passwords, one time password (OTP) keys, certificates and key pairs) and store them securely in a file on the PDA. This would involve the PC in communicating with a network connected SSO server 310 having an SSO datastore.

Figure 5:
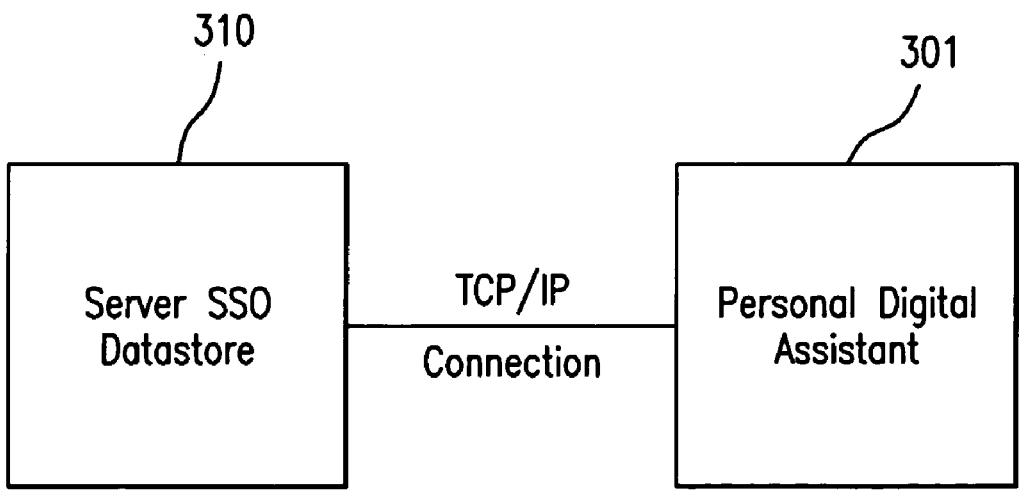
FIG. 5 is a block diagram of the embodiment of FIG. 4 in a further configuration.

In a further configuration illustrated in FIG. 5, the PDA communicates directory with the SSO 310 server via a TCP/IP connection. The operation of this further configuration is the same as that of the first, with the exception that the service queried by the program on the PDA resides on the SSO server 310.

Once the user credentials are stored on the PDA, the user can run a program on the PDA that allows them to retrieve their credentials. This program first prompts them for authorisation details (such as a PIN) and then displays their credentials or, in the case of one time passwords, generates a valid one time password. For security, administrators or users can restrict which credentials are replicated to the PDA.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein and defined in the claims which follow.

The claims defining the invention are as follows:

1. A method for providing remote user access to a secure application by deployment of single sign-on (SSO) software to client workstations, said method comprising:
   navigating to a secure server using a web browser on a remote workstation;
   providing user authorisation details to the secure server;
   downloading an SSO deployment file to the remote workstation upon validation of the user authorisation details;
   executing the SSO deployment file to install an SSO client application on the remote workstation;
   reading workstation settings and user credentials from a secure file or data store; and
   running the SSO client application on the workstation to employ the user credentials to logon to the secure application, wherein:
   the SSO client application intercepts and responds to authentication requests issued by the secure application and received at the remote workstation.

2. The method of claim 1 wherein, if the remote workstation is a shared client workstation, the method further includes uninstalling the SSO client application upon any of:
   a) termination of the web browser application,
   b) log off from a current user session, or
   c) re-starting of the client workstation.

3. The method of claim 1 wherein, if the remote workstation is a single user client workstation, the SSO client application starts automatically without requiring re-entry of user credentials.

4. The method of claim 1 wherein the SSO client application facilitates reduced or single sign on type remote access to a plurality of secure applications.

5. The method of claim 1 wherein a secure file for the user credentials is stored on at least one of:
   a) the user workstation,
   b) the web server, and
   c) a secure third party server.

6. The method of claim 5 wherein the secure file takes the form of an LDAP directory entry, an ordinary file on a local or remote file system, a file on a portable storage device, a token or a smart card.

7. The method of claim 1 wherein user credentials may take the form of identifiers; passwords, including one-time passwords (OTP); pass phrases; certificates; encryption, signing and authentication key pairs or keys; Kerberos tickets; any other authentication or authorisation data.

8. The method of claim 1 wherein the user credentials are secured in a local file by the user authorisation details.

9. The method of claim 1 wherein installing the SSO client application is undertaken dynamically to deliver client application functionality based on at least one of client location and user credentials.

10. The method of claim 1 further including a step of consolidating, encrypting and storing user credentials in the secure file or data store.

11. The method of claim 1 wherein the user authorisation details are encrypted and stored on a web server.

12. The method of claim 11 wherein the SSO client application is further configured, in the event that a secure application prompts user credentials to be changed, to:
- intercept such application prompts;
- ask the user for the changed credentials or automatically generate changed user credentials;
- validate that the changed credentials meet the secure application's requirements;
- enter the changed credentials into the application prompt that was intercepted; and
- encrypt and send the changed credentials to the secure file or SSO datastore.

13. The method of claim 12 wherein changes to the SSO datastore are monitored and transferred to an authentication database of the secure application.

14. A system for providing remote user access to a secure application by deployment of single sign-on (SSO) software to client workstations, said system comprising:
- a secure server, having a processor, coupled to a publicly accessible global communications network, said secure server having a single sign-on (SSO) service module, an SSO deployment file and associated user authorisation details;
- at least one remote workstation having a web browser for navigating to the secure server via the publicly accessible global communications network; and
- wherein the SSO deployment file includes instructions for execution on a plurality of processors, and the SSO deployment file includes a management control program for controlling download from the secure server and installation of an SSO client application on said at least one remote workstation, and once installed, the SSO client application provides sign-on and user credential caching in relation to said secure application for the user at said remote workstation, and wherein the SSO client application intercepts and responds to authentication requests issued by the secure application and received at the at least one remote workstation.

15. The system of claim 14 wherein the SSO service module effects initial user authentication and thereafter manages download of the SSO deployment file for execution on said at least one remote workstation.

16. The system of claim 14 further including a sub-system for reverse synchronisation of user credentials required to access secure applications for a server managing an SSO datastore accessible by a plurality of remote workstations, said sub-system including:
- an SSO datastore monitor server coupled to the server for monitoring changes to user credentials in the SSO datastore; and
- upon changes being effected to user credentials for a secure application, said SSO datastore monitor server is configured to:
  - connect to a respective back-end system hosting said secure application, and
  - modify the corresponding user credentials held in an authentication database for the secure application on the back-end system.

17. The method of claim 1, wherein the requests are issued by at least one of mainframe applications, web sites, Java applications, Unix applications and Windows applications.

18. A non-transitory computer readable storage medium storing software modules that provide remote user access to a secure application by deployment of single sign-on (SSO) software to client workstations, the software modules comprising executable code that is executable to:
- provide user authorisation details to a secure server;
- download an SSO deployment file to a remote workstation upon validation of the user authorisation details;
- execute the SSO deployment file to install an SSO client application on the remote workstation;
- read workstation settings and user credentials from a secure file or data store; and
- run the SSO client application on the workstation to employ the user credentials to logon to the secure application, wherein the SSO client application intercepts and responds to authentication requests issued by the secure application and received at the remote workstation.

19. The non-transitory computer readable storage medium of claim 18, wherein the requests are issued by at least one of: mainframe applications, web sites, Java applications, Unix applications and Windows applications.

20. The non-transitory computer readable storage medium of claim 18, the software modules includes executable code that is executable to further configure the SSO client application, in the event that a secure application prompts user credentials to be changed, to:
- intercept such application prompts;
- ask the user for the changed credentials or automatically generate changed user credentials;
- validate that the changed credentials meet the secure application's requirements;
- enter the changed credentials into the application prompt that was intercepted; and
- encrypt and send the changed credentials to the secure file or SSO datastore.

\* \* \* \* \*